(12) United States Patent
Hattori et al.

(10) Patent No.: US 7,291,663 B2
(45) Date of Patent: Nov. 6, 2007

(54) CONDUCTIVE ELASTOMER COMPOSITION, CONDUCTIVE ROLLER, AND CONDUCTIVE BELT

(75) Inventors: Takayuki Hattori, Hyogo (JP); Tetsuo Mizoguchi, Hyogo (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 31 days.

(21) Appl. No.: 10/461,505

(22) Filed: Jun. 16, 2003

(65) Prior Publication Data

US 2003/0236330 A1 Dec. 25, 2003

(30) Foreign Application Priority Data

Jun. 19, 2002 (JP) .............................. 2002-179099

(51) Int. Cl.
*C08K 5/435* (2006.01)
*C08L 9/02* (2006.01)

(52) U.S. Cl. ............... 524/168; 524/393; 524/462; 524/395; 524/565; 524/571; 525/236; 525/238; 525/107; 525/122; 525/523

(58) Field of Classification Search ............... 524/418, 524/419, 428, 159, 161, 163, 166, 168, 393, 524/462, 395, 565, 571; 525/523, 539, 107, 525/122, 236, 238
See application file for complete search history.

(56) References Cited

U.S. PATENT DOCUMENTS

| | | | |
|---|---|---|---|
| 5,733,235 A | 3/1998 | Waku et al. | |
| 5,761,581 A * | 6/1998 | Nojima | 399/174 |
| 6,243,552 B1 | 6/2001 | Murata | |
| 6,245,420 B1 * | 6/2001 | Nishio et al. | 428/292.1 |
| 6,299,790 B1 * | 10/2001 | Kono et al. | 252/62.2 |
| 6,316,149 B1 * | 11/2001 | Garbe et al. | 429/304 |
| 6,589,299 B2 * | 7/2003 | Missling et al. | 29/623.5 |
| 6,648,807 B2 * | 11/2003 | Hashimoto et al. | 492/59 |
| 6,697,587 B2 * | 2/2004 | Harada | 399/111 |
| 6,699,936 B1 * | 3/2004 | Nishimura et al. | 525/208 |

FOREIGN PATENT DOCUMENTS

| | | | |
|---|---|---|---|
| EP | 0 894 824 | | 2/1999 |
| EP | 0 994 143 A1 | | 4/2000 |
| JP | 9-123677 A | | 5/1997 |
| JP | 2000-239445 A | * | 5/2000 |
| JP | 2000-265008 A | | 9/2000 |
| JP | 2002-105305 A | * | 4/2002 |
| JP | 2002-121376 A | * | 4/2002 |

OTHER PUBLICATIONS

JP 2002-105305 (Abstract and English translation).*

* cited by examiner

*Primary Examiner*—David W. Wu
*Assistant Examiner*—Rip A. Lee
(74) *Attorney, Agent, or Firm*—Birch, Stewart, Kolasch & Birch, LLP

(57) ABSTRACT

A conductive roller or a conductive belt is composed of a conductive elastomer composition including a polymer composition having a plurality of carbon-to-carbon double bonds and containing not less than 40 mol % of ethylene oxide; an organometallic salt containing a fluoro group or/and a sulfonyl group; and an elastomer having a plurality of carbon-to-carbon double bonds.

14 Claims, 2 Drawing Sheets

CONDUCTIVE ELASTOMER COMPOSITION, CONDUCTIVE ROLLER, AND CONDUCTIVE BELT

BACKGROUND OF THE INVENTION

1. Field of the Invention

The present invention relates to a conductive elastomer composition, a conductive roller, and a conductive belt. More particularly, the conductive roller and the conductive belt composed of the conductive elastomer composition is used effectively as a charging roller, a developing roller, a toner supply roller, a transfer roller, a transfer belt, and the like for a copying machine, a printer, and the like to realize a low electric resistance and superior properties.

2. Description of the Related Art

It is necessary to allow the charging roller, the developing roller, the toner supply roller, the transfer roller, and the transfer belt for use in the copying machine and the printer to have an appropriate stable electric resistance value. To impart electric conductivity to the roller and the belt of this kind, the following two methods are known: an electroconductive elastomer containing a conductive filler such as powder of metal oxide or carbon black therein is used in one of them. An ionic-conductive elastomer such as urethane rubber, acrylonitrile-butadiene rubber (NBR), and epichlorohydrin rubber is used in the other of them.

The conductive roller or the conductive belt composed of the electroconductive elastomer containing the conductive filler has a problem that it has variations in the electric resistance value thereof, i.e., the conductive roller or the conductive belt does not have a constant electric resistance value. In the case where the carbon black is used as the conductive filler, there is no stable correlation between the addition amount of the carbon black and the volume resistivity of the electroconductive elastomer, and there is a region in which the electric resistance value of the conductive roller or the like changes rapidly owing to a slight change of the addition amount of the carbon black. Thus it is very difficult to control the electric resistance. In addition, the electric resistance value depends on an applied voltage.

Because it is difficult for the conductive filler to disperse uniformly in the elastomer, the electric resistance value has variations in the circumferential and widthwise directions of the conductive roller or the conductive belt. Even though a large variation of the electric resistance value is reduced, a variation of the electric resistance value as small as a μm order is still present. Recently, a high image quality is provided by using digital image processing technique and color image processing technique. Thus the ionic-conductive elastomer is used in preference over the electroconductive elastomer.

As conductive agents of the ionic-conductive elastomer, a conductive oligomer and a conductive plasticizer (Mn is less than 10000) containing a polyether structure such as polyethylene oxide are known. The ionic-conductive elastomer using these conductive agents bleed or bloom and is liable to stain a photosensitive member.

In addition to the above-described conductive agents, a method of using acrylonitrile-butadiene rubber (NBR) or a method of using urethane rubber is also known. However, these rubbers provide a volume resistivity of not less than $10^{9.6}$ Ω·cm (electric resistance of roller is $10^{8.2}$ Ω). Thus these methods cannot be used for a transfer roller or a transfer belt for a color image processing apparatus which requires a comparatively low electric resistance. However, the elastomer containing only the NBR is not favorable in resistance to ozone.

In the case of the conductive roller or the conductive belt for a copying machine or a printer, a comparatively low trifluoromethanesulfonyl is required for the transfer belt and the transfer roller for a color copying machine or the like, the charging roller, the developing roller, the toner supply roller, and the like. Thus the use of only the above-described polymers are incapable of coping with this requirement. The level of the conductivity provided by these conductive agents is insufficient for preventing a silica tire and general rubber products from being charged.

Epichlorohydrin rubber or an ethylene oxide-propylene oxide-allyl glycidyl ether copolymer is used singly or in combination with other materials for the above-described use and some types of charging rollers, developing rollers, toner supply rollers, and the like. In addition, various proposals are made.

Various trials for increasing the ionization degree and realizing a lower electric resistance have been made by adding a quaternary ammonium salt containing perchloric acid ions or chloride ions to the ionic-conductive elastomer such as the acrylonitrile-butadiene rubber (NBR), the urethane rubber, epichlorohydrin rubber, a mixture formed by adding the epichlorohydrin rubber or the ethylene oxide-propylene oxide-allyl glycidyl ether copolymer thereto.

For example, in the rubber composition disclosed in Japanese Patent Application Laid-Open No. 9-132677, it is easy to impart conductivity to the rubber composition in which a quaternary ammonium salt of perchloric acid is added to the acrylonitrile-butadiene rubber or the epichlorohydrin rubber and control the electric resistance value.

However, the compression set of the rubber composition disclosed in Japanese Patent Application Laid-Open No. 9-132677 is not sufficiently reduced. That is, most of the chlorine of the quaternary ammonium salt has a secondary reaction, thereby deteriorating the compression set of the rubber composition outstandingly. Therefore the conductive roller or the conductive belt composed of the rubber composition has a problem in the durability and size stability thereof.

It is preferable to use a material having a low compression set for the conductive roller or the conductive belt and rubber products. Thus various proposals are made to solve this problem. However, a material having a preferable conductivity, a low hardness, and a low compression set has not been developed.

SUMMARY OF THE INVENTION

The present invention has been made in view of the above-described problems. Therefore it is an object of the present invention to provide a conductive elastomer composition having a low electric resistance value and preferable mechanical properties (low compression set, low hardness) and a conductive roller and a conductive belt which are composed of the conductive elastomer composition and durable and superior in the dimensional stability thereof.

To achieve the object, the present invention provides a conductive elastomer composition including a polymer composition having a plurality of carbon-to-carbon double bonds and containing not less than 40 mol % of ethylene oxide; an organometallic salt containing a fluoro group or/and a sulfonyl group; and an elastomer having a plurality of carbon-to-carbon double bonds.

As described above, the conductive elastomer composition of the present invention includes the polymer composition containing not less than 40 mol % of the ethylene oxide having a preferable molecular motion and giving ions much stability. The organometallic salt containing a fluoro group or/and a sulfonyl group has a very high degree of dissociation and has a high solubility for the polymer composition having not less than 40 mol % of the ethylene oxide. Thus the conductive elastomer composition has a very high conductivity. Moreover, the polymer composition having not less than 40 mol % of the ethylene oxide is highly compatible with polar rubbers, thermoplastic elastomers, and resins. Thus by blending and alloying the polymer composition and the elastomer having the carbon-to-carbon double bond with each other, it is possible to improve the mechanical property of the conductive elastomer composition.

Therefore the conductive elastomer composition of the present invention has a low electric resistance value and has good mechanical properties (low compression set, low hardness) suitable for a conductive roller and a conductive belt. Thus products suitable for practical use can be composed of the conductive elastomer composition.

It is preferable that the organometallic salt containing a fluoro group or/and a sulfonyl group includes at least one metallic salt selected from a group of metallic salts of bis(fluoroalkyl-sulfonyl)imide or from a group of metallic salts of fluoroalkylsulfonic acid. Because the electric charge of the anions of the metallic salt of the bis(fluoroalkylsulfonyl)imide or the metallic salt of the fluoroalkylsulfonic acid is not localized owing to the high electron attraction effect, the anions are stable in polyethylene oxide. Thus the metallic salt shows a high degree of dissociation, thus realizing a high ionic conductivity. It is possible for the conductive elastomer composition to have a low electric resistance efficiently since the conductive elastomer composition contains the organometallic salt containing a fluoro group or/and a sulfonyl group. Therefore by appropriately adjusting the amount of the polymer components, it is possible to prevent the photosensitive member from being stained while maintaining a low electric resistance.

As the organometallic salt, the lithium salt is preferable. In addition, salts of the alkalie metal, the group 2A metals or other metals may be used as the organometallic salt.

More specifically, the following organometallic salts can be used: $LiCF_3SO_3$, $LiAsF_6$, $LiN(SO_2CF_3)_2$, $LiC(SO_2CF_3)_3$, $LiCH(SO_2CF_3)_2$, $LiSF_5CF_2SO_3$, and $Li[(OCH(CF_3)_2)_6Nb]$. It is preferable that any of the organometallic salts is uniformly dispersed in the conductive elastomer composition. Of the above-described organometallic salts, the organometallic salt of bis(fluoroalkylsulfonyl)imide such as $LiN(SO_2CF_3)_2$ dissolves in polyethylene oxide chain at a high solubility and is capable of plasticizing the polyethylene oxide chain. Thus by adding the organometallic salt of bis(fluoroalkylsulfonyl)imide to the polymer composition, it is possible to reduce the hardness of the conductive elastomer composition and the dependency degree of the volume resistivity thereof on environment.

It is favorable to add not less than 0.1 parts by weight nor more than 20 parts by weight of the organometallic salt to 100 parts by weight of the entire polymer components.

If less than 0.1 parts by weight of the organometallic salt is added to the entire polymer components, the effect of improving the conductivity is hardly obtained. On the other hand, if more than 20 parts by weight of the organometallic salt is added to the entire polymer components, the conductivity is improved but the cost becomes high.

It is more favorable to add not less than 0.25 parts by weight nor more than 15 parts by weight of the organometallic salt to 100 parts by weight of the entire polymer components. The entire polymer components means the total of the polymer components of the polymer composition and the elastomer.

It is favorable that the weight ratio between the polymer composition and the elastomer is (2.5:97.5) to (50:50).

One of the reasons the above range is set is as follows: If the amount of the polymer composition is more than the specified amount, the conductive elastomer composition has a high hardness or a much stickiness. As another reason, when the conductive elastomer composition is used to form the conductive roller or the conductive belt, the photosensitive member may be stained. On the other hand, if the amount of the polymer composition is smaller than the specified amount, the amount of the organometallic salt which can disperse in the conductive elastomer composition becomes small. Consequently it is difficult to improve the conductivity of the conductive elastomer composition sufficiently. The weight ratio between the polymer composition and the elastomer is more favorably (5:95) to (45:55) and most favorably (10:90) to (40:60).

As the polymer composition, it is preferable to use an ethylene oxide-propylene oxide-allyl glycidyl ether copolymer containing the ethylene oxide at not less than 40 mol %.

It is preferable to use an epichlorohydrin-ethylene oxide-allyl glycidyl ether copolymer or/and an epichlorohydrin-allyl glycidyl ether copolymer or/and acrylonitrile-butadiene rubber as the elastomer, because these elastomers are compatible with the polymer composition, are ionic-conductive, and have a comparatively low electric resistance value respectively. In addition, as the elastomer, it is possible to use chloroprene rubber, ethylene-propylene-diene copolymer rubber (EPDM), natural rubber, and isoprene rubber etc. Since these rubbers have carbon-to-carbon double bonds, they can be effectively co-crosslinked with the polymer composition by using sulfur or peroxide.

For the reason described below, it is preferable that the copolymerization ratio among the ethylene oxide, the propylene oxide, and the allyl glycidyl ether of the copolymer is set to 50 to 90 mol %, 1 to 49 mol %, 1 to 10 mol % respectively and that the number-average molecular weight Mn of the copolymer is set to not less than 10000.

The ionic conductivity is displayed in the conductive elastomer composition, because oxonium ions and metal cations (for example, lithium ion of organometallic salt, nickel ion contained in age resistor for polymer) in the polymer are stabilized by the ethylene oxide unit and transported by a segment motion of the molecular chain of the ethylene oxide unit. Thus the higher the ratio of the ethylene oxide unit is, the more ions can be stabilized and hence a low electric resistance can be displayed.

However, if the copolymerization ratio of the ethylene oxide is too high, the ethylene oxide crystallizes and hence the segment motion of the molecular chains thereof is inhibited. Thus the volume resistivity of the conductive elastomer composition increases. The propylene oxide is copolymerized with the ethylene oxide to prevent the ethylene oxide from crystallizing.

If the copolymerization ratio of the ethylene oxide is less than 50 mol % and the copolymerization ratio of the propylene oxide is more than 49%, ions are not sufficiently stabilized, which has little effect of decreasing the volume resistivity of the conductive elastomer composition. On the other hand, if the copolymerization ratio of the ethylene oxide is more than 95 mol % and the copolymerization ratio of the propylene oxide is less than 1 mol %, the volume resistivity of the conductive elastomer composition becomes too high, and further the hardness thereof becomes too high owing to crystallization of the ethylene oxide. In this case, a roller or a belt composed of the conductive elastomer composition cannot be put into practical use.

Crosslinking can be accomplished by copolymerizing the allyl glycidyl ether with the ethylene oxide and the propylene oxide. Thereby the conductive elastomer composition is allowed to have improved properties. That is, the conductive elastomer composition hardly shows bleeding, hardly stains the photosensitive member, and is allowed to have rubber elasticity. Because the allyl glycidyl ether unit obtains a free volume as the side chain, it is possible to prevent crystallization of the ethylene oxide. Therefore it is possible for the conductive elastomer composition to have a very low electric resistance which cannot be realized by the conventional art.

The reason the copolymerization ratio of the allyl glycidyl ether is set to 1 to 10 mol % is for the following reason: If the copolymerization ratio is less than 1 mol %, the conductive elastomer composition is liable to bleed and stain the photosensitive member. On the other hand, if the copolymerization ratio is more than 10 mol %, the conductive elastomer composition has a large number of crosslinked points after vulcanization is performed. Thus it is difficult to realize a low electric resistance, and the tensile strength, fatigue characteristic, and flexing resistance thereof deteriorate.

By copolymerizing the allyl glycidyl ether with the ethylene oxide and the propylene oxide, the crystallization of the ethylene oxide is prevented to reduce the volume resistivity of the conductive elastomer composition. Further by the copolymerization of the allyl glycidyl ether, crosslinking of the copolymer with other rubbers can be accomplished by introduction of the carbon-to-carbon double bond. By co-crosslinking of the copolymer with other rubbers, it is possible to prevent the conductive elastomer composition from bleeding and the photosensitive member from being stained. By co-crosslinking of the copolymer with other rubbers, it is possible to increase the molecular weight of the conductive elastomer composition. Therefore even though the conductive elastomer composition contains a considerably large amount of the ethylene oxide-propylene oxide-allyl glycidyl ether copolymer, the conductive elastomer composition hardly bleeds and hardly stains the photosensitive member.

It is preferable that the ethylene oxide-propylene oxide-allyl glycidyl ether terpolymer (hereinafter referred to as EO-PO-AGE terpolymer) has a number-average molecular weight Mn of not less than 10000 to prevent bleeding and stain on photosensitive member.

It is preferable that in a permanent set testing methods for rubber, vulcanized or thermoplastic specified in JIS K6262, the value of the compression set of the conductive elastomer composition is not more than 25% when it is measured at a temperature of 70° C. for 24 hours.

If the compression set of the conductive elastomer composition is more than 25%, the dimensional change of a roller composed of the conductive elastomer composition is so large that the roller cannot be put into practical use. It is preferable that the compression set of the conductive elastomer composition is not more than 25% even in the case where the conductive elastomer composition is used as a foamed member (sponge), although in this case, the compression set is different to some extent from 25% in dependence on a foaming rate and a foaming mode.

It is preferable that the volume resistivity of the conductive elastomer composition specified by JIS K6911 is less than $10^{9.0}[\Omega\cdot cm]$ when it is measured at an applied voltage of 500V. If the volume resistivity of the conductive elastomer composition is more than $10^{9.0}$ $\Omega\cdot cm$, a roller or a belt composed of the conductive elastomer composition has a low efficiency in transfer, charging, and supply of toner. Thus the roller or the belt composed of the conductive elastomer composition cannot be put into practical use.

The volume resistivity specified in JIS K6911 is measured at a constant temperature of 23° C., a constant relative humidity of 55%, and at an applied voltage of 500V.

It is favorable that the conductive elastomer composition of the present invention has an asker C hardness less than 70 degrees. This is because the softer the conductive elastomer composition is, the larger the nip is. Consequently transfer, charging, and development can be accomplished with high efficiency, and mechanical damage to members such as a photosensitive member can be reduced. The softer the conductive elastomer composition, the more favorable. When the conductive elastomer composition is solid, it is more favorable that the solid rubber is in the range of 50 to 70 degrees.

It is preferable to use the acrylonitrile-butadiene rubber (NBR) containing liquid acrylonitrile-butadiene rubber.

The use of the acrylonitrile-butadiene rubber containing the liquid acrylonitrile-butadiene rubber allows the polymer chain to move easily. Thus with high processability, a conductive roller or a conductive belt can be composed of the conductive elastomer composition containing it. Further the use of the acrylonitrile-butadiene rubber containing the liquid acrylonitrile-butadiene rubber increases transport efficiency of ions. Thus the conductive elastomer composition has a low volume resistivity. Further the use of the acrylonitrile-butadiene rubber containing the liquid acrylonitrile-butadiene rubber allows the conductive elastomer composition to be extruded favorably. Therefore it is possible to obtain the conductive roller and the conductive belt having a favorable surface on which no wrinkles are formed.

The NBR containing the liquid acrylonitrile-butadiene rubber and a large amount of acrylonitrile is compatible with the EO-PO-AGE terpolymer, thus having the effect of making the surface of rubber preferable after the components are kneaded or when the kneaded components are extruded and the effect of reducing the hardness of a vulcanized conductive elastomer composition. Therefore it is very suitable to use the NBR containing the liquid acrylonitrile-butadiene rubber and a large amount of the acrylonitrile in combination with the EO-PO-AGE terpolymer. The NBR containing the acrylonitrile in an intermediate amount (25% to 36% of acrylonitrile), a large amount (36% to 43% of acrylonitrile), and a very large amount (more than 43% of acrylonitrile) can be preferably used. However, it is possible to use the NBR containing a small amount of the acrylonitrile. Even the NBR containing a small amount (less than 25% of acrylonitrile) of the acrylonitrile is compatible with the EO-PO-AGE terpolymer to such an extent as not to pose a problem in practical use. In the case where the NBR is mixed with EPDM to improve ozone resistance of the conductive elastomer composition, it is preferable to use the NBR containing a small amount of the acrylonitrile in consideration of the degree of compatibility with the EPDM. In the region of practical use, the use of the NBR containing a small amount of the acrylonitrile allows the extent of dependency of a molecular motion on temperature to be smaller than the extent of dependency of the molecular motion on temperature in the use of the NBR containing an intermediate amount or a large amount of the acrylonitrile. Thus the use of the NBR containing a small amount of the acrylonitrile has an advantage of reducing the dependency of the volume resistivity on environment.

A mixture of high molecular weight NBR and liquid NBR can be very suitably used because the mixture is capable of preventing the photosensitive member from being stained and keeping the property of the rubber composition. For example, the mixture of high molecular weight NBR and liquid NBR commercially available is Nippol DN223 (trade name) manufactured by Zeon Corporation.

Use of ionic-conductive agents in combination with the organometallic salt allows the conductive elastomer composition to have preferable property and provides a great effect of reducing the electric resistance. For example, a quaternary ammonium salt is preferable as the ionic-conductive agent to be used in combination with the organometallic salt. The quaternary ammonium salt not containing halogen and particularly, the quaternary ammonium salt not containing chlorine can be suitably used because it prevents the compression set of the conductive elastomer composition from deteriorating and an increase of the hardness thereof.

It is preferable to add not less than 0.1 parts by weight nor more than 10 parts by weight of the ionic-conductive agent for 100 parts by weight of the entire polymer components.

As the quaternary ammonium salt not containing the halogen, it is possible to use salts of comparatively strong acid such as a quaternary ammonium salt of sulfonic acid or a quaternary ammonium salt of gluconolactone. These salts have high ionization degrees. Thus it is possible to realize a low electric resistance efficiently, reduce the compression set, and prevent the photosensitive member from being stained.

A sulfur-vulcanizing system is suitable because it realizes a low electric resistance and a low degree of stain. As the vulcanizing accelerators, it is preferable to use dibenzothiazyldisulfide and tetramethylthiurammonosulfide in combination. Instead of the dibenzothiazyldisulfide, 2-mercaptobenzothiazole or the like may be used.

It is preferable to use a vulcanizing system composed of sulfur(S)/dibenzothiazyldisulfide(DM)/tetramethylthiurammonosulfide (TS) or a vulcanizing system composed of sulfur (S)/2-mercaptobenzothiazole (M)/tetramethylthiurammonosulfide (TS) for the mixture of the polymer composition and the elastomer. Thereby it is possible to accomplish efficient co-crosslinking, reducing the degree of stain on the photosensitive member, and reduce the compression set.

A preferable vulcanizing system is composed of sulfur, dibenzothiazyldisulfide, and tetramethylthiurammonosulfide mixed with each other at the ratio of 1.5, 1.5, and 0.5 respectively. Another preferable vulcanizing system is composed of sulfur, 2-mercaptobenzothiazole, and tetramethylthiurammonosulfide mixed with each other at the ratio of 1.5, 1.5, and 0.5 respectively.

Thereby it is possible to shorten a vulcanizing time period, efficiently accomplish co-crosslinking of each of the polymer composition and the elastomer, and reduce the possibility of staining the photosensitive member.

Vulcanization can be accomplished by conventional methods. For example, vulcanization can be made in a vulcanizing can under a water vapor pressure or press vulcanization may be performed. Secondary vulcanization may be performed as necessary.

It is possible to perform vulcanization by a peroxide vulcanizing system. It is possible to prevent the photosensitive member from being stained by performing vulcanization in combination of the peroxide vulcanizing system and secondary vulcanization.

The polymer composition is compatible with polar rubbers such as urethane rubber, acrylic rubber, and the like and thermoplastic elastomer (for example, urethane thermoplastic elastomer (TPU), polyamide thermoplastic elastomer (TPA), and the like), resins (for example, nylon, polyester, and the like). Therefore these substances may be added to the polymer composition to improve the mechanical properties of the conductive elastomer composition.

The conductive roller and the conductive belt are formed by molding the conductive elastomer composition.

The conductive elastomer composition of the present invention is superior because it has a low volume resistivity, a low compression set, and a low hardness. Since the conductive roller composed of the conductive elastomer composition has a low electric resistance value, conductive elastomer composition can be suitably used for rollers that require a low electric resistance value, for example, a transfer roller and a charging roller for a color copying machine and the like, a toner supply roller, a developing roller, and the like.

The conductive roller can be produced by conventional methods. For example, the conductive elastomer composition is preformed into the shape of a tube with a single axis extruder. Then the preform is vulcanized at 160° C. for 10–60 minutes. Thereafter a core metal is inserted into a hollow portion of the vulcanized tube. After the surface of the tube is polished, the tube is cut to a predetermined size. An optimum vulcanizing time period should be set by using a vulcanization testing rheometer (for example, cure meter). The vulcanization temperature may be set around 160° C. in dependence on necessity.

To form the conductive belt, known methods can be used. More specifically, the conductive elastomer composition (kneaded) is extruded in the shape of a belt by an extrusion molding machine. Then the molded conductive elastomer composition is vulcanized at 160° C. for 10–60 minutes to form the body of the belt. The vulcanization temperature may be set around 160° C. in dependence on necessity.

DETAILED DESCRIPTION OF THE PREFERRED EMBODIMENTS

Figure 1:
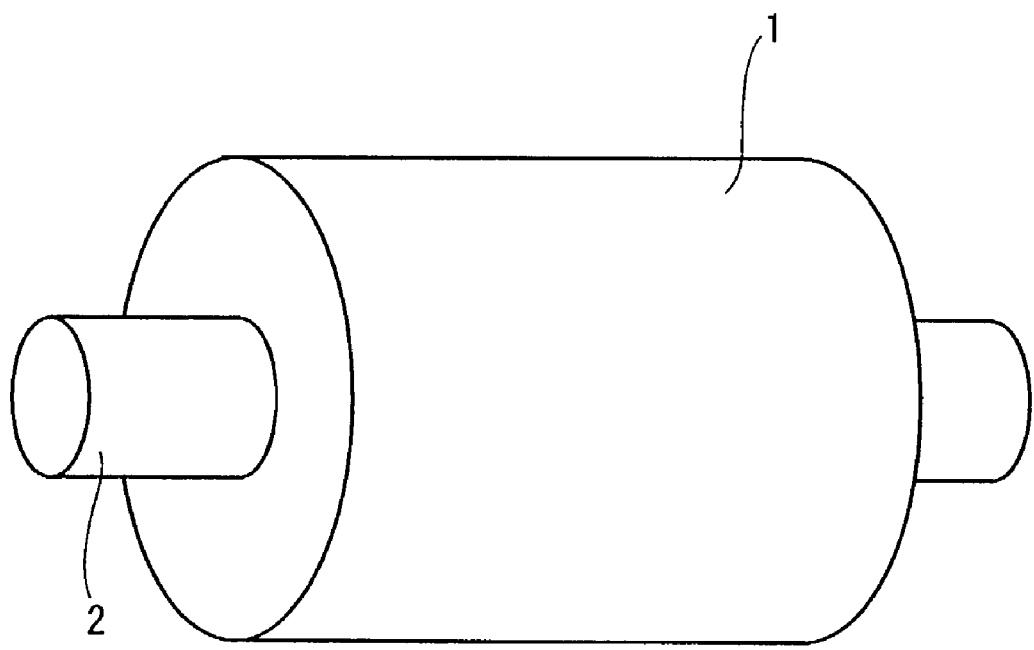
FIG. 1 is a schematic view showing a conductive roller of the present invention.

The embodiments of the present invention will be described below with reference to the drawings.

A conductive elastomer composition of a first embodiment of the present invention includes a polymer composition having a plurality of carbon-to-carbon double bonds and containing not less than 40 mol % of ethylene oxide. Used as the polymer composition is 21 parts by weight of an ethylene oxide-propylene oxide-allyl glycidyl ether (EO-PO-AGE) terpolymer copolymerized at the ratio of 90 mol %/4 mol %/6 mol % and having a number-average molecular weight Mn of 80000. The conductive elastomer composition includes 79 parts by weight of acrylonitrile-butadiene rubber as an elastomer having carbon-to-carbon double bonds. The conductive elastomer composition further includes 5 parts by weight of lithium-bis(trifluoromethylsulfonyl)imide as an organometallic salt containing fluoro group or/and sulfonyl group.

The following substances are added to 100 parts by weights of the polymer components (21 parts by weight of polymer composition+79 parts by weight of elastomer): 1.5 parts by weight of a vulcanizer, 1.5 parts by weight of a vulcanizing accelerator 1 (dibenzothiazyl-disulfide), 0.5 parts by weights of a vulcanizing accelerator 2 (tetramethylthiurammonosulfide), 20 parts by weights of an inorganic filler, 5 parts by weights of zinc oxide, and 1 part by weight of stearic acid.

The acrylonitrile-butadiene rubber is a mixture of 100 parts by weights of normal high molecular weight acrylonitrile-butadiene rubber and 50 parts by weights of liquid acrylonitrile-butadiene rubber.

The EO-PO-AGE terpolymer and the lithium-bis (trifluoromethylsulfonyl)imide are mixed uniformly with each other to obtain a dispersion. The following substances are added to the dispersion: the acrylonitrile-butadiene rubber, the vulcanizer, the vulcanizing accelerator, the filler, the zinc oxide, and the stearic acid. The mixture is melted and kneaded by using a known rubber kneader such as an internal mixer. Thereby the conductive elastomer composition for use in the conductive roller is obtained.

In a permanent set testing methods for rubber, vulcanized or thermoplastic specified in JIS K6262, the value of the compression set of the conductive elastomer composition is 17% when the compression set is measured at a temperature of 70° C. for 24 hours. The volume resistivity of the conductive elastomer composition specified in JIS K6911 is $10^{7.5}[\Omega\cdot cm]$ when it is measured at a constant temperature of 23° C., a constant relative humidity of 55%, and an applied voltage of 500V. Dependency $\Delta \log_{10} \rho_v[\Omega\cdot cm]$ of the volume resistivity of the conductive elastomer composition on environment between a temperature of 10° C., a relative humidity of 15% and a temperature of 32.5° C., a relative humidity of 90% is 1.2. The asker C hardness is 60 degrees.

The kneaded material is preformed in the shape of a tube with a single axis extruder. After the preform is vulcanized at 160° C. for 10–60 minutes, a metal shaft is inserted into a hollow portion of a vulcanized tube and bonded thereto. After the surface of the rubber tube is polished, the tube is cut to a predetermined size. In this way, a conductive roller 1 is obtained. As shown in FIG. 1, the conductive roller 1 is approximately cylindrical. A shaft 2 is inserted into the conductive roller 1.

Since the conductive elastomer composition contains the polymer composition, the organometallic salt, and the elastomer, the obtained conductive roller has a low volume resistivity, a comparatively low dependency on environment, does not stain a photosensitive member, has a low compression set and hardness, is superior in dimensional stability, and is durable.

In the first embodiment, the conductive roller composed of the conductive elastomer composition is used as the transfer roller. But needless to say, by appropriately setting amounts of the components of the conductive elastomer composition, the conductive roller can be used as a charging roller, a developing roller, a toner supply roller, and the like. The conductive elastomer composition may be used to form a foamed roll by adding blowing agents to the components of the conductive elastomer composition.

Figure 2:
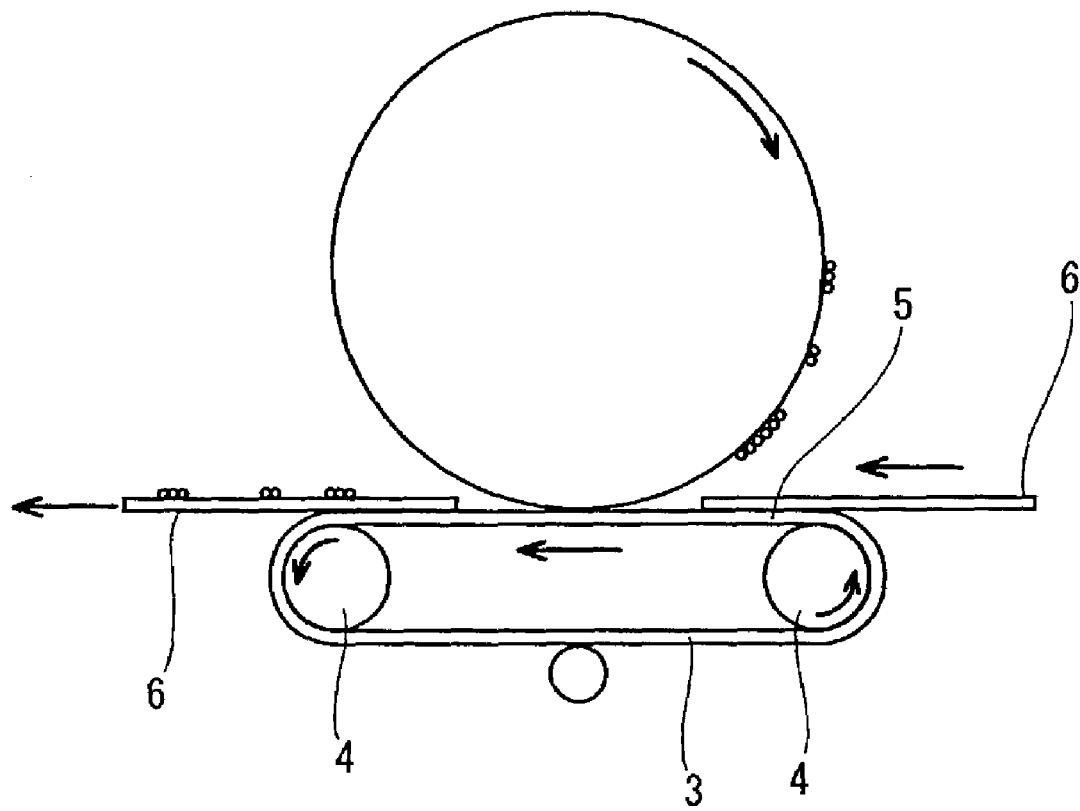
FIG. 2 is a schematic view showing a conductive belt of the present invention.

As shown in FIG. 2, a conductive belt 3 is composed of the conductive elastomer composition to use it as a transfer belt. The conductive belt 3 is tight-stretched by two or more pulleys 4. The conductive belt 3 serves as a means for transporting a sheet 6 such as paper by movably holding it on its straight portion 5 disposed at its upper side and transferring a toner image formed on a photosensitive member to the sheet 6.

The examples and comparison examples of the present invention will be described in detail below.

Using the materials containing components shown in tables 1 and 2, property-evaluating rubber slab sheets and specimens were prepared for examples 1 through 5 and comparison examples 1 through 4.

TABLE 1

| Mixed chemicals | Chemicals (name(= Commercial name), maker) | | E1 | E2 | E3 | E4 | E5 | E6 |
|---|---|---|---|---|---|---|---|---|
| EO-PO-AGE copolymer (EO:PO:AGE = 90:4:6, Mn = 80000) | ZSN8030 | Zeon | 21 | 8 | 30 | 8 | 21 | |
| Conductive organometallic salt 1 | | | 5 | 2 | 7 | 2 | 5 | |
| Conductive organometallic salt 2 | | Kishida Chemical | | | | | | |
| acrylonitrile-butadiene rubber (Mn = 190000, 5000) | Nipol DN223 | Zeon | 79 | 92 | 70 | | 79 | |
| epichlorohydrin (EO:EP:AGE = 56:40:4, Mn = not less than 140000) | Epichlomer CG102 | Daiso | | | | 92 | | |
| Ionic-conductive additive 1 | KP-4729 | Kao | | | | | 5 | |
| Inorganic filler 1 | precipiated calcium carbonate light | Maruo Calcium | 20 | 20 | 20 | 20 | 20 | |
| Hydrotalcite-like compound | DHT-4A-2 | Kyowa Chemical Industry | | | | 2.8 | | |
| Zinc oxide | Ginrei R | Toho Aen | 5 | 5 | 5 | 5 | 5 | 5 |
| Stearic acid | 4931 | Unikema Australia | 1 | 1 | 1 | 1 | 1 | |
| Vulcanizer 1 | powdery sulfur | Tsurumi Kagaku | 1.5 | 1.5 | 1.5 | 1.5 | 1.5 | |
| Vulcanizing accelerator 1 | Nocceler DM | Ouchishinko Chemical Industry | 1.5 | 1.5 | 1.5 | 1.5 | 1.5 | |
| Vulcanizing accelerator 2 | Nocceler TS | Ouchishinko Chemical Industry | 0.5 | 0.5 | 0.5 | 0.5 | 0.5 | |
| Volume resistivity (500 V) | | | 7.5 | 8.5 | 6.9 | 7.3 | 7.1 | |
| Dependency of volume resistivity on environment | | | 1.2 | 1.3 | 1.1 | 0.7 | 1.2 | |
| Compression set (evaluated by using solid rubber specimen) (%) | | | 17 | 13 | 23 | 25 | 20 | |
| Test for examining stain on photosensitive member | | | ◯ | ◯ | ◯ | ◯ | ◯ | |
| Hardness (asker C hardness) | | | 60 | 60 | 63 | 68 | 62 | | where E denotes example.

TABLE 2

| Mixed chemicals | Chemicals (name(= Commercial name), maker) | | CE1 | CE2 | CE3 | CE4 |
|---|---|---|---|---|---|---|
| EO-PO-AGE copolymer (EO:PO:AGE = 90:4:6, Mn = 80000) | ZSN8030 | Zeon | 21 | 21 | | |
| Conductive organometallic salt 1 | | | | | | |
| Conductive organometallic salt 2 | | | | | | |
| acrylonitrile-butadiene rubber (Mn = 190000, 5000) | Nipol DN223 | Zeon | 79 | 79 | 100 | |
| epichlorohydrin (EO:EP:AGE = 56:40:4, Mn = not less than 140000) | Epichlomer CG102 | Daiso | | | | 100 |
| Ionic-conductive additive 2 | 86 p conc. | Kao | | 5 | | |
| Ionic-conductive additive 3 | Sankonol PEO-2OR | Sanko Chemical Indusry | | | 5 | 5 |
| Inorganic filler 1 | precipiated calcium carbonate light | Maruo Calcium | 20 | 20 | 20 | 20 |
| Hydrotalcite-like compound | DHT-4A-2 | Kyowa Chemical Industry | | | | 3 |
| Zinc oxide | Ginrei R | Toho Aen | 5 | 5 | 5 | 5 |
| Stearic acid | 4931 | Unikema Australia | 1 | 1 | 1 | 1 |
| Vulcanizer 1 | powdery sulfur | Tsurumi Kagaku | 1.5 | 1.5 | 1.5 | 1.5 |
| Vulcanizing accelerator 1 | Nocceler DM | Ouchishinko Chemical Industry | 1.5 | 1.5 | 1.5 | 1.5 |
| Vulcanizing accelerator 2 | Nocceler TS | Ouchishinko Chemical Industry | 0.5 | 0.5 | 0.5 | 0.5 |
| Volume resistivity (500 V) | | | 9.1 | 8.0 | 8.0 | 7.7 |
| Dependency of volume resistivity on environment | | | 1.4 | 1.4 | 1.5 | 1.3 |
| Compression set (evaluated by using solid rubber specimen) (%) | | | 19 | 29 | 15 | 29 |
| Test for examining stain on photosensitive member | | | Δ | X | X | X |
| Hardness (asker C hardness) | | | 67 | 70 | 64 | 70 | where CE denotes comparison example.

The numerical values (from EO-PO-AGE copolymer to vulcanizing accelerator 2) shown in tables 1 and 2 indicate parts by weight. The abbreviation EO represents ethylene oxide; PO: propylene oxide; AGE: allyl glycidyl ether; and EP: epichlorohydrin.

The acrylonitrile-butadiene rubber shown in tables 1 and 2 is a mixture of 100 parts by weights of normal (high molecular weight)acrylonitrile-butadiene rubber and 50 parts by weights of liquid acrylonitrile-butadiene rubber.

As the vulcanizing accelerator 1, dibenzothiazyldisulfide was used. As the vulcanizing accelerator 2, tetramethylthiuram-monosulfide was used.

In tables 1 and 2, the copolymerization ratio among the ethylene oxide, the epichlorohydrin, and the allyl glycidyl ether of the epichlorohydrin rubber was set to 56 mol %, 40 mol %, 4 mol % respectively. The number-average molecular weight Mn of the copolymer of the epichlorohydrin rubber was set to not less than 140000.

In table 1, as the conductive organometallic salt 1 containing fluoro group and/or sulfonyl group, lithium-bis(trifluoromethylsulfonyl)imide ($LiN(SO_2CF_3)_2$) was used.

The lithium-bis(trifluoromethylsulfonyl)imide was formed by a known method. The lithium salt of the trifluoromethylsulfonic acid commercially available was used.

As the ionic-conductive additive 1 shown in table 1, KP-4729 (gluconolactone salt) which is a quaternary ammonium salt not containing halogen was used.

As the ionic-conductive additive 2 shown in table 2, a quaternary ammonium salt (Quartamin 86 p conc., produced by Kao Corporation) containing chlorine was used. As the ionic-conductive additive 3 shown in table 2, polyether polyol in which 20 wt % of lithium-bis(trifluoromethylsulfonyl)imide was dispersed (trade name: Sankonol PEO-2OR, produced by Sanko Chemical Industry Co., Ltd.) was used.

EXAMPLES 1 THROUGH 5

The conductive elastomer composition was obtained by mixing the EO-PO-AGE terpolymer and the acrylonitrile-butadiene rubber or the epichlorohydrin rubber, the conductive organometallic salt 1 or 2 containing fluoro group and/or sulfonyl group, and additives one another at the ratios specified in table 1.

The conductive elastomer composition was prepared by a method similar to that of the first embodiment. That is, the EO-PO-AGE terpolymer and the organometallic salt were mixed uniformly with each other to obtain a dispersion. The dispersion, the elastomer such as the NBR, and the additives was kneaded by using an internal mixer (DS10-40MWA-S manufactured by Moriyama Seisakusho).

COMPARISON EXAMPLES 1 THROUGH 4

In comparison example 1, the EO-PO-AGE terpolymer and the acrylonitrile-butadiene rubber were mixed with each other at the same ratio as that of the example 1, but the organometallic salt containing the fluoro group and/or the sulfonyl group was not added thereto.

In comparison example 2, the EO-PO-AGE terpolymer and the acrylonitrile-butadiene rubber were mixed with each other at the same ratio as that of the example 1, and the ion-conductive additive 2 containing chlorine was added thereto.

In comparison example 3, only the acrylonitrile-butadiene rubber was used as the polymer, and the ion-conductive additive 3 was added thereto.

In comparison example 4, only the epichlorohydrin rubber was used as the polymer, and the ion-conductive additive 3 was added thereto.

The components mixed with each other at the ratios shown in tables 1 and 2 were kneaded by an internal mixer (DS10-40MWA-S manufactured by Moriyama Seisakusho).

Rubber taken out as a ribbon from the mixer was extruded by a roller head extruder to form it into a sheet. Pressing cure of the sheet-shaped rubber is performed in a mold at 160° C. for an appropriate time period to obtain property evaluation slab sheets and specimens.

The following measurements were conducted to examine the characteristics of the prepared slab sheet of each of the examples and the comparison examples. Tables 1 and 2 show the results in the lower portion thereof.

Measurement of Volume Resistivity and Dependency of Volume Resistivity on Environment Slab sheets (130 mm×130 mm×2 mm) were prepared to measure the volume resistivity $\rho_v$(Ωcm) specified in JIS K6911 at an applied voltage of 500V, a constant temperature of 23° C., and a constant relative humidity of 55% with a digital ultrahigh resistance meter R8340A manufactured by Advantest Corporation.

Each table shows the volume resistivity by common logarithm.

The volume resistivity $\log_{10} \rho_v$ was also measured at a temperature of 10° C., a relative humidity of 15% and also a temperature of 32.5° C., a relative humidity of 90%.

By using an equation shown below, dependency of the volume resistivity on environment was computed:

$$\Delta \log_{10} \rho_v = \log_{10} \rho_v \text{ (10° C., relative humidity: 15\%)} - \log_{10} \rho_v \text{ (32.5° C., relative humidity: 90\%)}$$

Measurement of Compression Set

In accordance with the "Permanent set testing methods for rubber, vulcanized or thermoplastic" specified in JIS K6262, the compression set was measured at 70° C. for 24 hours.

Test for Examining Stain on Photosensitive Member

A fragment of the slab sheet of each of the examples and the comparison examples was kept for two weeks at 32.5° C. and a relative humidity of 90%, with each fragment pressed against a photosensitive member set in a cartridge (cartridge type: 4127X) of a laser beam printer of Laser Jet 4050 type produced by Hewlett-Packard Company. After each fragment was removed from the photosensitive member, a half-tone printing was carried out by the printer accommodating the photosensitive member. Whether or not on printed sheets of paper there were stains caused by pollution of photosensitive member was visually checked to make evaluations at the following three criteria:

○: On printed paper no stain was observed when they were visually checked.

Δ: Low degree of stain (after five or less sheets of paper were printed, stains on the paper were hardly observed and thus no problem in use)

X: High degree of stain (after five or more sheets of paper were printed, stains on the paper could be still recognized visually)

Hardness (Asker C Hardness)

The hardness of each roller prepared as described above was measured by a rubber hardness meter "SRIS0101" manufactured by Kobunshi Keiki Co., Ltd. by applying a load of 1000 g thereto.

As indicated in table 1, the specimens of the examples 1 through 5 composed of the conductive elastomer composition of the present invention had low volume resistivities in the range of $10^{6.9}$ Ωcm to $10^{8.5}$ Ωcm and low compression sets in the range of 13% to 25%. In the evaluation of the test for examining the stain on the photosensitive member, the specimens of the examples 1 through 6 were rated as ○. That is, they did not stain the photosensitive member. The hardness of the roller of each of the examples 1 through 5 was low, namely, in the range of 60 to 68 degrees.

As described above, the volume resistivity of the specimen of each of the examples 1 through 5 was low. The dependency degree of the volume resistivity thereof on environment was comparatively low. The compression set thereof was also low. The photosensitive member was not stained. Further the rollers had a low hardness respectively.

In addition to the components of the specimen of the example 1, the specimen of the example 5 contained the ion-conductive additive 1 not containing chlorine. Thereby the specimen of the example 5 had a low compression set. The roller had a low hardness. The photosensitive member was not stained. The specimen of the example 5 had a lower volume resistivity than that of the specimen 1.

The specimen of each of the examples 1, 2, 3, and 5 contained the organometallic salt containing the fluoro group and/or the sulfonyl group. Smaller amount of the expensive EO-PO-AGE terpolymer and epichlorohydrin rubber was used for the specimen of each of the examples 1, 2, 3, and 5. In this case, a low electric resistance could be realized. Hence they could be formed at low costs.

The specimen of the comparison example 1 was different from the specimen of the example 1 in that the former did not contain the organometallic salt containing the fluoro group and/or the sulfonyl group. Therefore the specimen of the comparison example 1 had a high volume resistivity of $10^{9.1}$ Ωcm which was higher than $10^{7.5}$ Ωcm of the specimen of the comparison example 1. Further the evaluation of the stain on the photosensitive member was not favorable.

The specimen of the comparison example 2 was different from the specimen of the example 1 in that the former did not contain the organometallic salt containing the fluoro group and/or the sulfonyl group but contained the ion-conductive additive 2 containing chlorine. The photosensitive member was stained. Further the specimen had a large compression set, and a comparatively high hardness. Furthermore the specimen had a higher volume resistivity than the specimen of the example 1.

Only the acrylonitrile-butadiene rubber was used as the polymer of the specimen of the comparison example 3. The specimen of the comparison example 3 contained the ion-conductive additive 3. The ion-conductive additive 3 was not fixed in the polymer by crosslinking. Therefore the photosensitive member was stained.

Only the epichlorohydrin rubber was used as the polymer of the specimen of the comparison example 4. The specimen of the comparison example 4 contained the ion-conductive additive 3. The ion-conductive additive 3 was not fixed in the polymer by crosslinking. Therefore the photosensitive member was stained. Further the specimen had a large compression set. Further the roller had a high hardness.

As apparent from the forgoing description, the conductive elastomer composition of the present invention contains a polymer composition having a plurality of carbon-to-carbon double bonds and containing not less than 40 mol % of ethylene oxide; the organometallic salt containing a fluoro group or/and a sulfonyl group; and an elastomer having a plurality of carbon-to-carbon double bonds. Thus the conductive elastomer composition has a low volume resistivity, a low hardness, a low compression set, and stains the photosensitive member to a low extent, thus having a low electric resistance value and preferable mechanical properties.

Since the conductive elastomer composition has a low volume resistivity and is superior in durability and serviceability, the conductive roller and the conductive belt composed of the conductive elastomer composition of the present invention can be suitably used as a transfer belt or a transfer roller for use in a color copying machine or the like requiring a comparatively low electric resistance to provide a high image quality.

What is claimed is:

1. A conductive elastomer composition comprising:
a polymer composition comprising an ethylene oxide-propylene oxide-allyl glycidyl ether copolymer containing said ethylene oxide at not less than 40 mol %;
an organometallic salt of bis(fluoroalkylsulfonyl)imide; and
an acrylonitrile-butadiene rubber elastomer having a plurality of carbon-to-carbon double bonds.

2. The conductive elastomer composition according to claim 1, wherein not less than 0.1 parts by weight nor more than 20 parts by weight of said organometallic salt is added to 100 parts by weight of entire polymer components; and
a weight ratio between said polymer composition and said elastomer is set to (2.5:97.5) to (50:50).

3. A conductive roller composed of the conductive elastomer composition according to claim 1.

4. A conductive belt composed of the conductive elastomer composition according to claim 1.

5. The conductive elastomer composition according to claim 1, in which the organometallic salt is mixed with an ethylene oxide-propylene oxide-allylglycidyl ether copolymer.

6. The conductive elastomer composition according to claim 1, wherein the dependency of volume resistivity on environment at $\Delta \log_{10}\rho_v$ (10° C., relative humidity: 15%)–$\Delta \log_{10}\rho v$ (32.5° C., relative humidity: 90%) is no more than 1.3.

7. A conductive elastomer composition comprising:
a polymer composition having a plurality of carbon-to-carbon double bonds and containing not less than 40 mol % of ethylene oxide;
an organometallic salt of bis(fluoroalkylsulfonyl)imide; and
an elastomer having a plurality of carbon-to-carbon double bonds;
wherein in a permanent set testing methods for rubber, vulcanized or thermoplastic specified in JIS K6262, a value of a compression set of said conductive elastomer composition is not more than 25% when said compression set is measured at a temperature of 70° C. for 24 hours; a volume resistivity of said conductive elastomer composition specified in JIS K6911 is less than $10^{9.0}$[Ωcm] when said volume resistivity is measured at an applied voltage of 500V; and an asker C hardness is less than 70 degrees.

8. A conductive roller composed of the conductive elastomer composition according to claim 7.

9. A conductive belt composed of the conductive elastomer composition according to claim 7.

10. A conductive elastomer composition comprising:
a polymer composition having a plurality of carbon-to-carbon double bonds and containing not less than 40 mol % of ethylene oxide;
an organometallic salt of bis(fluoroalkylsulfonyl)imide; and
an elastomer having a plurality of carbon-to-carbon double bonds, wherein the dependency of volume resistivity on environment at $\Delta \log_{10}\rho v$ (10° C., relative humidity: 15%)–$\Delta \log_{10}\rho v$ (32.5° C., relative humidity: 90%) is no more than 1.3.

11. A conductive roller composed of the conductive elastomer composition according to claim 10.

12. A conductive belt composed of the conductive elastomer composition according to claim 10.

13. A conductive elastomer composition comprising:
a polymer composition having a plurality of carbon-to-carbon double bonds and containing not less than 40 mol % of ethylene oxide;
an organometallic salt of bis(fluoroalkylsulfonyl)imide; and
an elastomer having a plurality of carbon-to-carbon double bonds;
wherein in a permanent set testing methods for rubber, vulcanized or thermoplastic specified in JIS K6262, a value of a compression set of said conductive elastomer composition is not more than 25% when said compression set is measured at a temperature of 70° C. for 24 hours; a volume resistivity of said conductive elastomer composition specified in JIS K6911 is less than $10^{9.0}$[Ωcm] when said volume resistivity is measured at an applied voltage of 500V; and an asker C hardness is less than 70 degrees, and
wherein the weight ratio between the polymer composition and the elastomer is (2.5:97.5) to (21:79).

14. A conductive elastomer composition comprising:
a polymer composition having a plurality of carbon-to-carbon double bonds and containing not less than 40 mol % of ethylene oxide;
an organometallic salt of bis(fluoroalkylsulfonyl)imide; and
an elastomer having a plurality of carbon-to-carbon double bonds, wherein the dependency of volume resistivity on environment at $\Delta \log_{10}\rho v$ (10° C., relative humidity: 15%)–$\Delta \log_{10}\rho v$ (32.5° C., relative humidity: 90%) is no more than 1.3,
wherein the weight ratio between the polymer composition and the elastomer is (2.5:97.5) to (21:79).

* * * * *